United States Patent [19]
Ogawara

[11] 3,968,403
[45] July 6, 1976

[54] CIRCUIT FOR CORRECTING DEFLECTION DISTORTION

[75] Inventor: Yoshiaki Ogawara, Inagi, Japan

[73] Assignee: Sony Corporation, Tokyo, Japan

[22] Filed: June 17, 1974

[21] Appl. No.: 480,204

[30] Foreign Application Priority Data
June 25, 1973  Japan.......................... 48-75198[U]

[52] U.S. Cl. .............................................. 315/371
[51] Int. Cl.² ......................................... H01J 29/56
[58] Field of Search ............ 315/370, 371, 399, 403

[56] References Cited
UNITED STATES PATENTS
3,712,999  1/1973  Smeulers et al. .................... 315/370
3,740,611  6/1973  Slavik ................................. 315/371

Primary Examiner—Maynard R. Wilbur
Assistant Examiner—G. E. Montone
Attorney, Agent, or Firm—Lewis H. Eslinger; Alvin Sinderbrand

[57] ABSTRACT

A circuit for correcting vertical deflection distortion of an image displayed by a cathode ray tube is composed of first, second, third, fourth, fifth and sixth transistors, a common load connected to output electrodes or collectors of the first and fourth transistors and a variable DC source connected to a control electrode or base of the sixth transistor. A saw-tooth signal having the vertical deflection frequency is applied to a control electrode or base of the third transistor, and the first and firth transistors and the second and fourth transistors are differentially switched at a rate corresponding to the horizontal deflection frequency so as to obtain from the load a signal for correcting vertical pincushion distortion.

10 Claims, 16 Drawing Figures

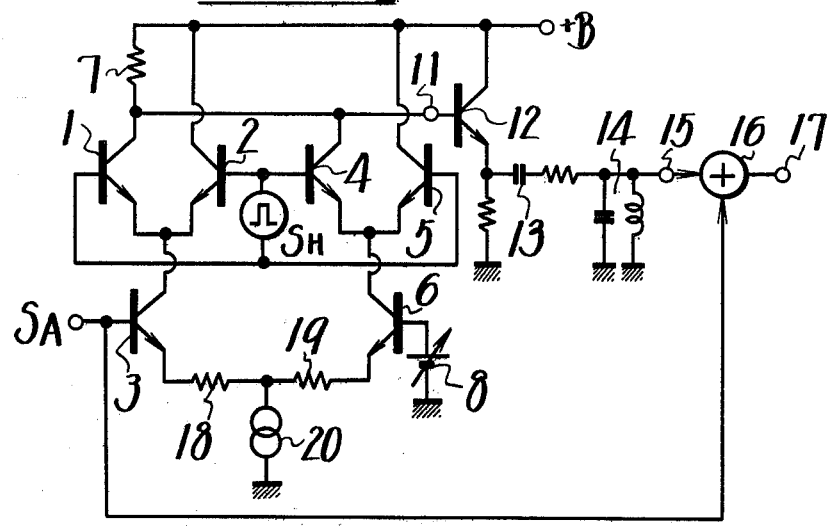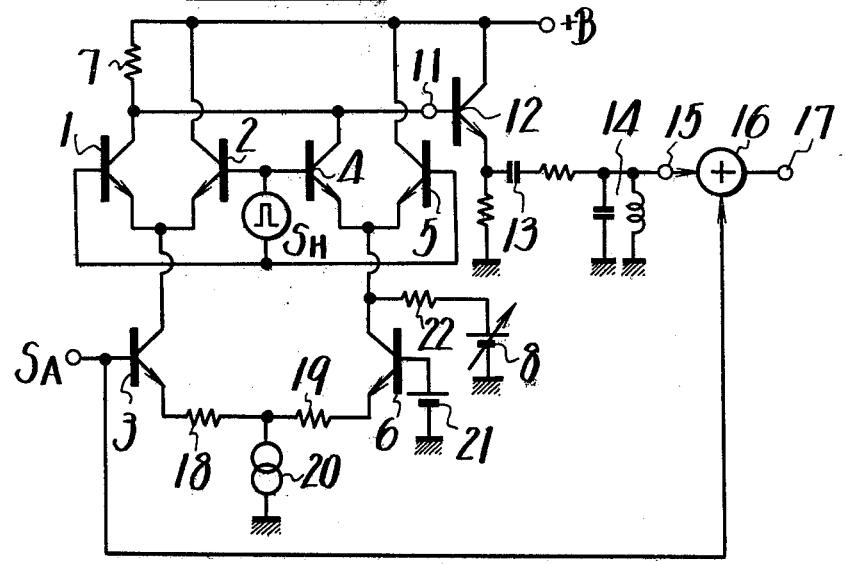

CIRCUIT FOR CORRECTING DEFLECTION DISTORTION

BACKGROUND OF THE INVENTION

1. Field of the Invention

The present invention relates generally to a circuit for correcting deflection distortion whose construction is markedly simplified over that of prior art correction circuits.

2. Description of the Prior Art

In television receivers which have recently been developed, the angular range over which the electron beams projected to the screen of the picture tube must be deflected is increased and hence the displayed picture is distorted in a vertical direction as shown, for example in FIGS. 1 to 3 of the accompanying drawings. FIG. 1 shows a picture distortion which is vertically symmetrical in respect of the top and bottom portions and FIGS. 2 and 3 show picture distortions of the top and bottom portions which are vertically asymmetrical.

SUMMARY OF THE INVENTION

The present invention proceeds on the discovery the the problem of deflection distortion as described above can be corrected by mixing a proper correction signal with a saw-tooth vertical deflection signal.

Accordingly, a main object of this invention is to provide a circuit for correcting deflection distortion in a television receiver.

Another object of this invention is to provide a circuit for correcting both symmetrical and asymmetrical deflection distortion of an image displayed on a cathode ray tube, the correcting circuit having a simple construction thereby to compensate for the deflection distortion.

A further object of this invention is to provide a circuit for correcting deflection distortion in which various conditions or degree of distortion can be easily corrected merely by adjusting a variable DC source.

Other objects, features and advantages of the present invention will be apparent from the following description taken in conjunction with the accompanying drawing.

BRIEF DESCRIPTION OF THE DRAWING

FIGS. 4, 5 and 6 are schematic diagrams respectively showing embodiments of this invention, and FIGS. 7 to 10, inclusive, are waveform diagrams of various signals produced by the circuits of FIGS. 4 to 6.

DESCRIPTION OF CERTAIN ONES THE PREFERRED EMBODIMENT

A description will be hereinafter given of various embodiments of this invention with reference to the drawings.

Figure 4:
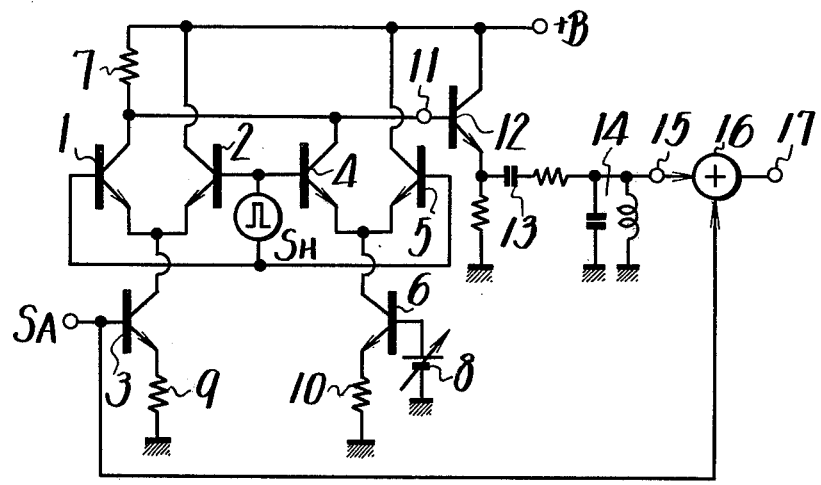
Figure 7A:
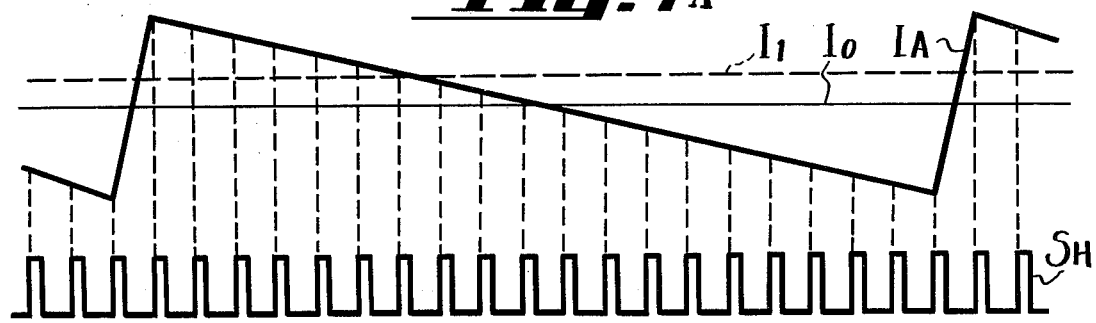

In the embodiment of FIG. 4, reference numerals 1 and 2 designate first and second transistors the controlled electrodes or emitters of which are interconnected and which are further connected to the output electrode or collector of a third transistor 3. Reference numerals 4 and 5 indicate fourth and fifth transistors the controlled electrodes or emitters of which are interconnected and which are further connected to the output electrode or collector of a sixth transistor 6. The output electrodes or collectors of the first and fourth transistors 1 and 4 are connected through a common load resistor 7 to a power source +B, while the output electrodes or collectors of the second and fifth transistors 2 and 5 are connected directly to the power source +B. The control electrode or base of, for example, the transistor 6 is connected to a variable DC source 8 while the control electrode or base of the third transistor 3 is applied with a vertical deflection frequency saw-tooth signal $S_A$ so as to cause a saw-tooth current $I_A$ such as shown in FIG. 7A having a frequency equal to the vertical deflection frequency to flow through the collector - emitter electrodes of the transistor 3. In this case, the controlled electrodes or emitters of the transistors 3 and 6 are grounded respectively through resistors 9 and 10. A pulse signal having a frequency corresponding to the line scanning rate, or horizontal deflection frequency, such as the horizontal synchronizing signal $S_H$ shown in FIG. 7A, is applied between the control electrodes or bases of the second and fourth transistors 2 and 4 and those of the first and fifth transistors 1 and 5 to cause the second and fourth transistors 2 and 4 and the first and fifth transistors 1 and 5 to be alternately switched on in a differential manner at a frequency determined by this horizontal pulse $S_H$.

The connection point of the collector electrodes of the first and fourth transistors 1 and 4 and the load resistor 7 is coupled to a terminal 11 which is connected through the base-emitter electrodes of a transistor 12, and further through a capacitor 13 for removing a saw-tooth component of 60Hz, to a resonance circuit 14, the resonance frequency of which is equal to horizontal frequency. The circuit 14 is further connected to a terminal 15.

Figure 1:
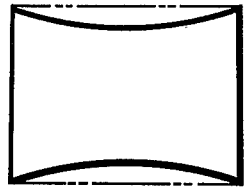
FIGS. 1, 2 and 3 are views showing various states of vertical pincushion distortion.
Figure 7B:

In the circuit described above, during the interval between adjacent horizontal pulses $S_H$ the first and fifth transistors 1 and 5 become conductive while the second and fourth transistors 2 and 4 become nonconductive. Thus, a current flowing through the load resistor 7 will flow through the first and third transistors 1 and 3 so that the current flowing through the load resistor 7 during this interval is switched or gated with the vertical deflection frequency saw-tooth current $I_A$. On the other hand, during the interval that of the horizontal pulse $S_H$ is present, the second and fourth transistors 2 and 4 become conductive while the first and fifth transistors 1 and 5 become nonconductive. Thus a current flowing through the load resistor 7 will flow through the fourth and sixth transistors 4 and 6. The current through the transistor 6 is essentially a direct current determined by the DC source 8. This current also flows through the transistor 4. Accordingly, for the case where the deflection distortion is, for example, symmetrical in at the top and bottom portions as shown in FIG. 1 through the collector-emitter electrodes of the transistor 6, the current $I_0$ being the variable DC source 8 is adjusted in advance, or present, so as to supply a DC current $I_0$, equal to the average value of the saw-tooth current $I_A$ (shown in FIG. 7A) flowing through the collector-emitter electrodes of the transistor 3. Thus, the current flowing through the load resistor 7 during the interval that the horizontal pulse $S_H$ is present is switched or gated with this DC current $I_0$. As a result, current pulses $P_0$, such as shown in FIG. 7B, are adapted to flow through the load resistor 7. As shown, during the interval between the horizontal pulses, the load resistor current is determined by the saw-tooth current $I_A$, and when the horizontal pulse is present, the load resistor current returns to the value determined by the DC source 8. The current $P_O$ appears to be the saw-tooth current $I_A$ modulated by the horizontal pulses $S_H$ superimposed on the DC level $I_O$. Accordingly, the base electrode of the transistor 12 is applied with a pulse voltage whose polarity is reversed with respect to that of this pulse current $P_O$. This pulse voltage is applied through the transistor 12 to the capacitor 13 to remove therefrom its saw-tooth component of 60Hz. The resonance circuit 14 then derives a correction signal $S_O$ from this pulse voltage. This correction signal $S_O$ assumes the form of a sine wave wherein each cycle corresponds to one horizontal period and its peak amplitude gradually changes from zero at a time point in the middle of the vertical deflection period to a maximum level at the beginning and end of the vertical deflection period.

Figure 8:
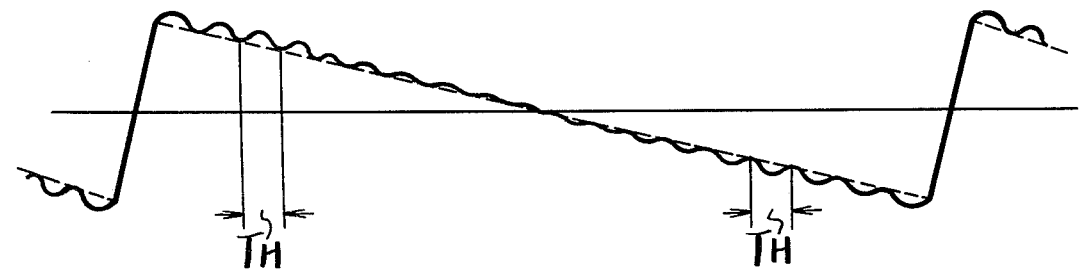

The signal $S_O$ is applied to an adder 16 whereat it is mixed with the vertical saw-tooth signal $S_A$ at a condition of its proper polarity and amplitude. Thus, the adder 16 supplies to an output terminal 17 a compensated saw-tooth vertical deflection signal, the saw-tooth shape having a value which varies substantially in a parabolic shape of the horizontal period $T_H$ and the level of this parabolic shape gradually changing from a minimum at a time point in the middle of the vertical deflection period to a maximum at the ends of the vertical deflection period, as depicted in FIG. 8. Accordingly, this correction signal is applied to a vertical deflection coil thereby to compensate for the deflection distortion as shown in FIG. 1.

Figure 2:
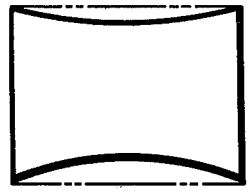
Figure 7C:
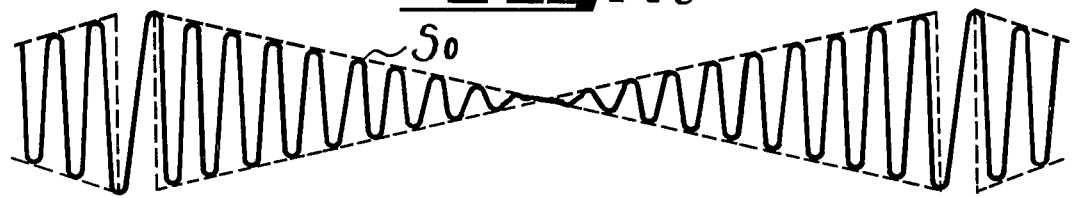
Figure 7D:
Figure 7E:
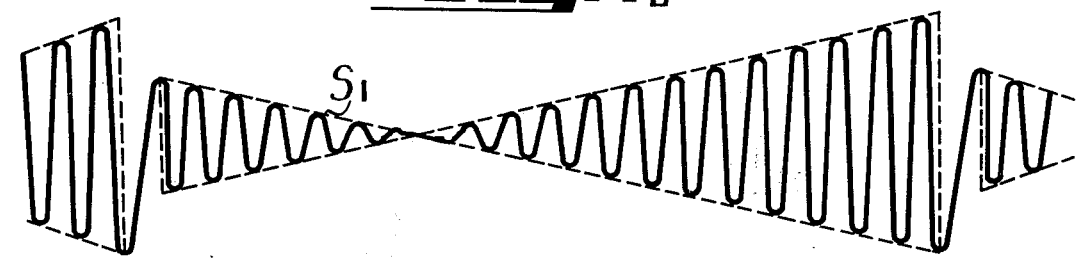

For the case where the deflection distortion is greater at the bottom portion of the picture as shown in FIG. 2, the variable DC source 8 is preferably adjusted to supply a current $I_1$ greater than the above mentioned current $I_0$ through the transistor 6, as shown in FIG. 7A. With this arrangement, the current $I_1$ is switched or gated through the load resistor 7 during the interval that the horizontal pulse $S_H$ is present. Consequently a current $P_1$ as shown in FIG. 7D flows through the load resistor 7, whereby the terminal 15 derives a correction signal $S_1$ whose amplitude increasing from zero at a time point in to the first half section of the vertical deflection period as shown in FIG. 7E. The correction signal has maximum amplitude at the end of the vertical deflection period. As a result, a compensated saw-tooth vertical deflection signal produced from the signal $S_1$ is obtained at the output terminal 17 so as to compensate the deflection distortion shown in FIG. 2.

Figure 3:
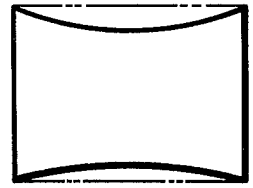

For the contrary case wherein the deflection distortion becomes greater at the top portion of the picture as shown in FIG. 3, the variable DC source 8 is adjusted so as to supply a current smaller than the current $I_0$ through the sixth transistor 6.

FIG. 5 shows another embodiment of this invention in which the controlled electrodes or emitters of the third and sixth transistors 3 and 6 are connected respectively through resistors 18 and 19 to a constant current source 29 so that, because of the recognized differential cooperation between these transistors, a saw-tooth current with polarity opposite to that of the saw-tooth current flowing through the collector-emitter electrodes of the third transistor 3 is adapted to flow through the collector-emitter electrodes of the sixth transistor 6.

Figure 9A:
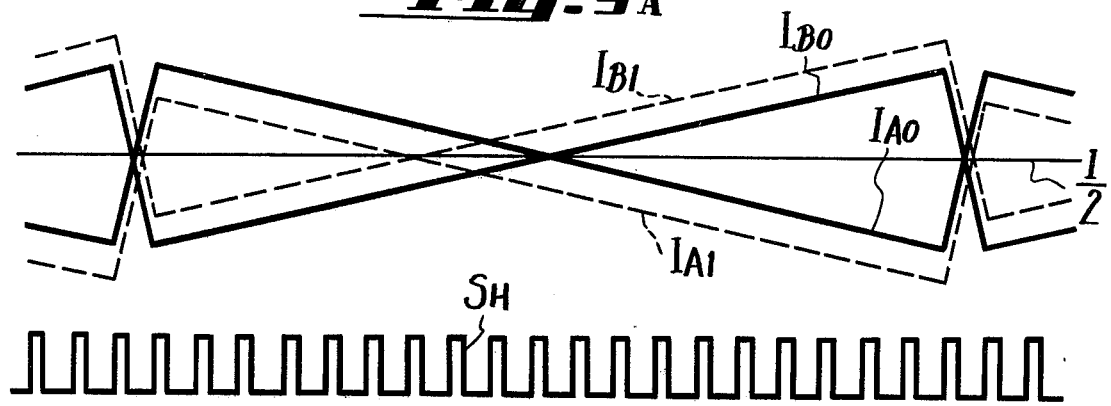
Figure 9B:

In this embodiment, let it be assumed that a current flowing through the constant current source 20 is I. For the case where the deflection distortion is verically symmetrical as depicted in FIG. 1, the variable DC source 8 is adjusted in such a manner that a saw-tooth current $I_{A0}$ having an average value of I/2 flows through the collector-emitter electrodes of the third transistor 3 while a saw-tooth current $I_{B0}$ having the same average value of I/2 but of opposite polarity to that of the current $I_{A0}$ flows through the collector-emitter electrodes of the sixth transistor 6 as shown in FIG. 9A. With this arrangement, the current $I_{A0}$ is switched or gated through the load resistor 7 during the intervals between adjacent horizontal pulses $S_H$ and the current $I_{B0}$ is switched or gated through the load resistor during the intervals that the horizontal pulse $S_H$ exists, so that a pulse current $P'_0$ as shown in FIG. 9B flows through the load resistor 7. The resonance circuit 14 derives the correction signal $S_0$ equal to that shown in FIG. 7C, from the pulse current $P'_0$ to thereby compensate the deflection distortion as shown in FIG. 1.

Figure 9C:
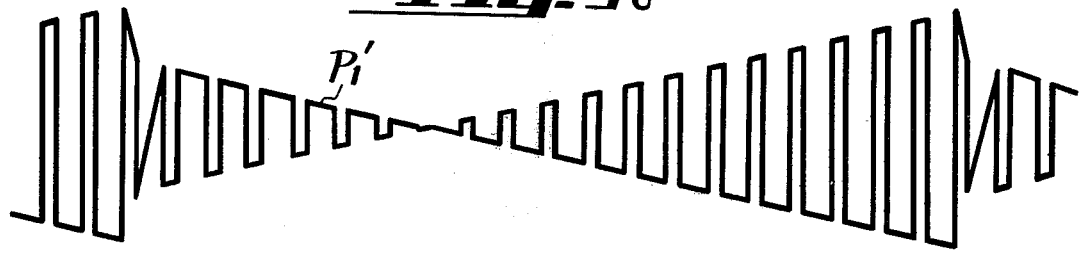

When the deflection distortion is of the type shown in FIG. 2, the variable DC source 8 is adjusted to increase its voltage so that the saw-tooth current flowing through the transistor 3 is shifted in its DC level as shown by $I_{A1}$ having an average value smaller than I/2. At the same time, the saw-tooth current flowing through the transistor 6 is shifted in the opposite direction, as shown by $I_{B1}$ having an average value greater than I/2. This is shown in FIG. 9A. With this arrangement, the current $I_{A1}$ is switched or gated through the load resistor 7 during the intervals between adjacent horizontal pulses $S_H$ and the current $I_{B1}$ is switched or gated through the load resistor during the intervals that the horizontal pulse $S_H$ exists so that a pulse current $P'_1$ such as shown in FIG. 9C flows through the load resistor 7. Accordingly, the resonance circuit 14 derives the same correction signal $S_1$ as shown in FIG. 7E from the pulse current $P'_1$ to thereby compensate the deflection distortion as shown in FIG. 2.

When the deflection distortion is of the type shown in FIG. 3, the variable DC source 8 need merely be adjusted in a reverse direction to achieve compensation.

FIG. 6 shows another embodiment of this invention in which the base electrode of the sixth transistor 6 is supplied with a fixed voltage by a source 21 and the output electrode or collector of the transistor 6 is connected through a resistor 22 to the variable DC source 8. For this case, if it is assumed that the current flowing through the constant current source 20 is I, then a saw-tooth current $I_A$ having an average value of I/2 may be applied through the collector-emitter electrodes of the transistor 3 while a saw-tooth current $I_B$ having an average value of I/2 may be applied through the collector-emitter electrodes of the transistor 6; these currents being shown in FIG. 10.

If a vertically symmetrical deflection distortion is present as depicted in FIG. 1, the variable DC source 8 is adjusted in such a manner that the current flowing through this transistor 4 or 5 is set equal to the current $I_B$ so that no current flows through the resistor 22. With this arrangement, the current $I_A$ is switched or gated through the load resistor 7 during the intervals between adjacent horizontal pulses $S_H$ and the current $I_B$ is switched or gated through the load resistor during the intervals that the horizontal pulse $S_H$ exists. Consequently, a pulse current $P'_0$ as shown in FIG. 9B flows through the load resistor 7. The correction signal $S_0$, as shown in FIG. 7C, thus is obtained at the terminal 15 to compensate for the deflection distortion shown in FIG. 1.

Figure 10:
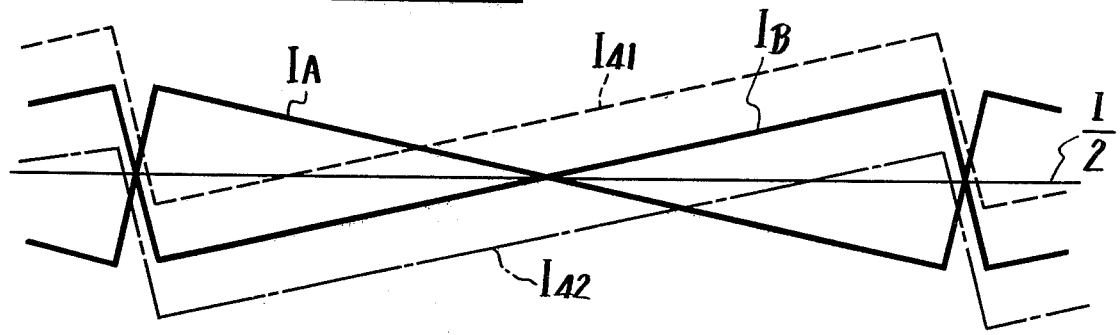

For the case wherein the deflection distortion is of the type shown in FIG. 2, the variable DC source 8 is preferably adjusted in such a manner that a saw-tooth current $I_{41}$ flows through the transistor 4 or 5. As shown in FIG. 10, this saw-tooth current $I_{41}$ is greater than $I_B$, and hence a constant current equal to the difference between $I_{41}$ and $I_B$ flows through the resistor 22 to the power source 8. The current $I_4$ is switched or gated through the load resistor 7 during the intervals between adjacent horizontal pulses $S_H$ and now the current $I_{41}$ is switched or gated through the load resistor during the intervals that the horizontal pulse $S_H$ exists.

If the deflection distortion is of the type shown in FIG. 3, the variable DC source 8 is desirably adjusted in such a manner that a saw-tooth current $I_{42}$ flows through the transistor 4 or 5. As shown in FIG. 10, this saw-tooth current $I_{42}$ is smaller than $I_B$, and hence a constant current equal to the difference between $I_B$ and $I_{41}$ flows from the source 8 through the resistor 22 to the transistor 6. The current $I_4$ is switched or gated through the load resistor 7 during the intervals between adjacent horizontal pulses $S_H$ and the current $I_{42}$ is switched or gated through the load resistor during the intervals that the horizontal pulse $S_H$ exists.

According to the embodiments of this invention, the circuits may be of simple construction to provide transistors and a variable DC source for producing an adjustable correction signal so as to derive a corrected saw-tooth vertical deflection signal. Adjustments are made according to the type of vertical pinushion distortion which is corrected. Hence, vertical pincushion distortion can be positively compensated for.

The variable DC source 8 for adjustment of the correcting signal may be connected to the base electrode of the third transistor 3 in the embodiments of FIGS. 4 and 5, or may be connected to the collector electrode of the third transistor 3 in the embodiment of FIG. 6. In these alternative arrangement of the embodiments of FIGS. 4 and 5 the base electrode of the sixth transistor 6 is applied with a fixed voltage. Further, the afore-described conduction relationship between the first and fifth transistors 1 and 5 and the second and fourth transistors 2 and 4 with respect to the horizontal pulse $S_H$ may be reversed. In addition, field effect transistor can be used as the respective transistors shown in the drawings.

It will be apparent that various other changes and variations can be effected without departing from the scope of the novel concepts of the present invention.

I claim as my invention:

1. A circuit for correcting deflection distortion in the image displayed on the screen of a cathode ray tube, comprising:
    first and second transistors interconnected at their controlled electrodes, respectively,
    a third transistor connected at its output electrode to a connection point of the controlled electrodes of said first and second transistors,
    fourth and fifth transistors interconnected at their controlled electrodes, respectively,
    a sixth transistor connected at its output electrode to a connection point of the controlled electrodes of said fourth and fifth transistors,
    a common load means connected to output electrodes of said first and fourth transistors,
    a variable DC supply means coupled to said sixth transistor,
    means for supplying a saw-tooth signal having a frequency equal to the vertical deflection frequency to said third transistor at its control electrode; and
    means for differentially supplying a switching signal having a frequency equal to the horizontal deflection frequency to said first and fifth transistors and to said second and fourth transistors to differentially switch said first and fifth transistors and said second and fourth transistors at said horizontal deflection frequency so as to derive from said load means a saw-tooth signal modulated by said switching signal for effecting a vertical pincushion distortion correction.

2. A circuit for correcting deflection distortion claimed in claim 1, wherein said DC supply means is connected to a control electrode of said sixth transistor.

3. A circuit for correcting deflection distortion claimed in claim 1, wherein said DC supply means is connected to an output electrode of said sixth transistor.

4. A circuit for correcting deflection distortion claimed in claim 1, wherein the controlled electrodes of said third and sixth transistors are connected in common and to a constant current source.

5. A circuit for correcting deflection distortion claimed in claim 1, wherein said switching signal is supplied to the control electrodes of the second and fourth transistors respectively.

6. A circuit for correcting deflection distortion claimed in claim 1, further comprising a resonance circuit coupled to the output of said common load means for deriving a correcting signal having a compensating component equal to the frequency of a horizontal synchronizing pulse.

7. A circuit for correcting vertical deflection distortion of an image displayed by a cathode ray tube, comprising:
    first differential switching means including first current determining means coupled to said first differential switching means for determining the current flowing through said first differential switching means;
    second differential switching means including second current determining means coupled to said second differential switching means for determining the current flowing through said second differential switching means;
    load means coupled in common to said first and second differential switching means for enabling currents determined by said first and second current determining means to flow therethrough to said first and second differential switching means;
    supply means coupled to said first current determining means for supplying a saw-tooth signal having a vertical deflection frequency so that a corresponding saw-tooth current flows through said first differential switching means, said saw-tooth current traversing an adjustable level;
    means for periodically switching said first and second differential switching means simultaneously at a rate equal to a horizontal deflection frequency so that the current flowing through said first differential switching means flows through said load means during a portion of the switching period and the current flowing through said second differential switching means flows through said load means during the remainder of said switching period;

adjustable DC supply means coupled to said second current determining means for supplying a DC signal of adjustable amplitude to thereby control said adjustable level which is traversed by said saw-tooth current; and output means coupled to said load means for producing a correcting signal in response to said currents flowing through said load means.

8. A circuit for correcting pincushion distortion of an image displayed by a cathode ray tube, said distortion being of a type which can be vertically symmetrical or asymmetrical, comprising:

first and second differential switching means including first and second current determining means, respectively, and being coupled to load means;

means for simultaneously switching said first and second differential switching means at a rate equal to a horizontal deflection frequency and means for supplying a vertical deflection signal to said first current determining means to thereby cause a correcting current to flow through said load means, said correcting current having a frequency equal to said horizontal deflection frequency and an envelope having a shape corresponding to said vertical deflection signal so that the amplitude of said correcting current varies from a minimum at a certain time point in said envelope to a maximum; and variable DC control means coupled to said second current determining means for adjusting the shape of said envelope to shift said time point in said envelope and to correspondingly change the maximum amplitude of said correcting current, thereby enabling correction of vertically asymmetrical distortion.

9. The circuit of claim 8 further comprising a resonance circuit coupled to said load means for producing a sinusoidal shaped compensating signal in response to said correcting current, said compensating signal having substantially the same envelope as said correcting current.

10. The circuit of claim 9 further comprising adding means for adding said compensating current to said vertical deflection signal to thereby produce a vertical deflection signal whose amplitude is varied in substantially a parabolic shape at the horizontal deflection frequency.

* * * * *